Patented Jan. 7, 1936

2,027,184

UNITED STATES PATENT OFFICE 2,027,184

VULCANIZATION ACCELERATOR

Wilhelm Lommel, Leverkusen-Wiesdorf, and Rudolf Schröter, Leverkusen-I. G. Werk, Germany, assignors to I. G. Farbenindustrie Aktiengesellschaft, Frankfort-on-the-Main, Germany No Drawing. Application January 4, 1933, Serial No. 650,138. In Germany January 5, 1932

2 Claims. (Cl. 18—53)

The present invention relates to a process of vulcanizing rubber, to new compositions of matter applied as vulcanization accelerators in said process and to the vulcanizates obtained by the process in question.

In accordance with the invention rubber is vulcanized, after having incorporated therewith a vulcanizing agent, such as sulfur, selenium, aromatic nitro compounds + metal oxides or the like, and a vulcanization accelerator which is not a high molecular aliphatic amine, in admixture with a high molecular aliphatic amine.

When using hereafter and in the claims the term "vulcanization accelerator" the same is intended to embrace vulcanization accelerators other than high molecular aliphatic amines. It may be mentioned that while the latter compounds, at least partly, possess some accelerating power, they are not, however, vulcanization accelerators in a technical sense.

The present invention is based upon the discovery that quite generally vulcanization accelerators are activated to a far reaching extent by the presence of the high molecular aliphatic amines without the danger of prevulcanization occurring. Furthermore, the combined use of vulcanization accelerators and of the amines in question has the advantage that in many cases vulcanizates of improved tensile strength are obtained, even in case the total amount of the accelerator and the amine is smaller than the amount of the respective accelerator employed in the previously known vulcanization processes.

Furthermore, since the amines in question do not discolor the vulcanizates to any substantial degree and do not lend any unpleasant odor to the same, the combined use of vulcanization accelerators and of high molecular aliphatic amines represents a remarkable advance in the art of vulcanizing rubber.

As mentioned above, all the known vulcanization accelerators are activated by the amines in question. The best results are, however, obtained, when applying accelerators which do not possess the character of so-called ultra-accelerators, such as unsubstituted or substituted mercaptoarylenethiazoles, thiuram-mono- and disulfides, diarylenethiazyldisulfides, etc.

Preferred high molecular aliphatic amines are those possessing a straight or branched aliphatic chain of more than 9 carbon atoms, such as 2-amino-nonodecane, amino-tridecane, heptadecylamines, n-undecylamine, dodecylamines, etc.

Generally, the amount of the amine to be added may be less than the amount of the accelerator used. For example, amounts of the amine corresponding to about 0.05 to 0.5% by weight (calculated on the rubber to be vulcanized) will yield good results in most cases.

The term "rubber" as used herein is intended to include natural rubber as well as artificial rubber-like masses obtainable, for example, by polymerizing butadiene hydrocarbons alone or in admixture with one another or with other suitable polymerizable compounds, such as styrene, vinyl-naphthalenes, acrylic acid, acrylic acid esters, acrylic acid nitriles, unsaturated ketones etc.

The following examples illustrate the invention which is not, however, restricted to the specific materials and proportions recited therein:

Example 1

| | Parts by weight |
|---|---|
| First latex crepe | 100 |
| Zinc oxide | 5 |
| Sulfur | 3 |
| Stearic acid | 1 | are well mixed with

| | Parts by weight |
|---|---|
| Dibenzothiazyl-disulfide | 0.6 | and

A mixture of 2-amino-nonodecane and ozokerite (60:40) ............ 0.3 and vulcanized by heating.

The following values were obtained:—

| Heating | Tensile strength in kg./sq. cm. | Extension in % |
|---|---|---|
| 2 atm. (superatm.) | | |
| 20 minutes | 220 (S+) | 823 |
| 30 minutes | 251 | 817 |
| 45 minutes | 198 | 753 |
| 60 minutes | 198 | 770 |
| 3 atm. (superatm.) | | |
| 10 minutes | 192 | 820 |
| 20 minutes | 198 | 777 |
| 30 minutes | 198 | 796 |
| 0.5 atm. (superatm.) | | |
| 40 minutes | Insufficiently vulcanized. | |

(+) S means separation of sulfur.

For comparison we give below the values which are obtainable, when vulcanizing the above mixture with 1 part by weight of benzothiazyl disulfide and without the addition of 2-amino-nonodecane:—

| Heating | Tensile strength in kg./sq. cm. | Extension in % |
|---|---|---|
| 2 atm. (superatmosph.) | | |
| 20 minutes | 112 (S+) | 930 |
| 30 minutes | 196 S | 855 |
| 45 minutes | 164 | 757 |
| 60 minutes | 161 | 738 |
| 3 atm. (superatmosph.) | | |
| 10 minutes | 133 S | 885 |
| 20 minutes | 171 | 792 |
| 30 minutes | 186 | 783 |
| 0.5 atm. (superatmosph.) | | |
| 40 minutes | Insufficiently vulcanized. | |

(+) S means separation of sulfur.

*Example 2*

|   | Parts by weight |
|---|---|
| Raw rubber | 100 |
| Sulfur | 3 |
| Zinc oxide | 5 |
| Stearic acid | 2 |
| Mercaptobenzothiazole | 0.4 |
| 2-amino-tridecane | 0.1 | are well mixed and vulcanized by heating. The following values were obtained:—

| Heating 110° C. | Tensile strength in kg./sq. cm. | Extension in % |
|---|---|---|
| 15 minutes | | |
| 20 minutes | 28 | 1,025 |
| 3 atm. (superatm.) | | |
| 15 minutes | 208 | 795 |
| 20 minutes | 220 | 795 |
| 25 minutes | 220 | 805 |
| 30 minutes | 190 | 775 |
| 45 minutes | 195 | 805 |

The following values were obtained when vulcanizing the above mixture, but without the addition of 2-amino-tridecane:—

| Heating 110° C. | Tensile strength in kg./sq. cm. | | Extension in % | |
|---|---|---|---|---|
| | A | B | A | B |
| 15 minutes | | | | |
| 20 minutes | | 59 | | 1,080 |
| 3 atm. (superatm.) | | | | |
| 15 minutes | 133 (S+) | 143 | 875 | 760 |
| 20 minutes | 149 | 192 | 855 | 765 |
| 25 minutes | 177 | 183 | 856 | 790 |
| 30 minutes | 160 | 171 | 840 | 780 |
| 45 minutes | 171 | 158 | 850 | 785 |

(+)S means separation of sulfur.
A=with the addition of 0.4 part by weight of mercapto-benzothiazole.
B=with the addition of 1.0 part by weight of mercapto-benzothiazole.

*Example 3*

A mixture of

|   | Parts by weight |
|---|---|
| Raw rubber | 100 |
| Sulfur | 3 |
| Zinc oxide | 5 |
| Dibenzothiazyl disulfide | 0.8 |
| 2-amino-nonodecane | 0.2 | obtained in the usual manner, is vulcanized by heating.

The following values were obtained compared with those obtained by vulcanizing the above mixture, but without the addition of 2-amino-nonodecane:—

| Heating 110° C. | Without addition | | With addition | |
|---|---|---|---|---|
| | Tensile strength kg./sq. cm. | Extension % | Tensile strength kg./sq. cm. | Extension % |
| 30 minutes | Insufficiently vulcanized. | | Insufficiently vulcanized. | |
| 3 atm. (superatm.) | | | | |
| 10 minutes | 155 (S+) | 905 | 242 | 845 |
| 20 minutes | 175 | 865 | 198 | 805 |
| 30 minutes | 183 | 885 | 202 | 825 |

(+)S means separation of sulfur.

The above table shows the considerable increase of the tensile strength by the addition of the small amount of 2-amino-nonodecane. The modulus shows that the vulcanizates obtained with the addition of the 2-amino-nonodecane are essentially tighter.

*Example 4*

A vulcanization mixture of

|   | Parts by weight |
|---|---|
| Raw rubber | 100 |
| Sulfur | 2.5 |
| Zinc oxide | 5 |
| Tetramethylthiuram disulfide | 0.25 |
| 2-amino-nonodecane | 0.1 | yields, when vulcanized for 20 minutes at 1.5 atmospheres (superatmospheric pressure), a vulcanizate of a tensile strength of 112 kg./sq. cm. at an extension of 700%. When working without the addition, a vulcanizate of a tensile strength of 94 kg./sq. cm. is obtained; from which it results that also in this case a tighter vulcanizate with a stronger nerve is obtained.

*Example 5*

A mixture of

|   | Parts by weight |
|---|---|
| Raw rubber | 100 |
| Zinc white | 5 |
| Sulfur | 3 |
| Dibenzothiazyl disulfide | 0.8 | is vulcanized at 3 atmospheres (superatmospheric pressure) for 10, 20 and 30 minutes with and without the addition of 0.2 part by weight of n-heptadecylamine. The tensile strengths of the vulcanizates obtained with the addition of the compound in question are for about 40 kg./sq. cm. higher than those of the vulcanizates without the said addition, and the former vulcanizates are also considerably tighter.

*Example 6*

When vulcanizing the mixture of example 5 with 2.5 parts by weight of sulfur and 0.25 part by weight of tetramethylthiuram disulfide and with the addition of (a) n-undecylamine (b) n-dodecylamine (c) n-heptadecylamine the following values were obtained for the tensile strength in kg./sq. cm. at an extension of 700%, which show that the vulcanizates obtained with the addition of the above named amines are considerably tighter than those obtained without such an addition:—

| Heating 0.5 atm. (superatm.) | Without addition | +0.1 part by weight of a | +0.1 part by weight of b | +0.1 part by weight of c |
|---|---|---|---|---|
| 30 minutes | Insufficiently vulcanized | | | |
| 1.5 atm.(superatm.) | | | | |
| 15 minutes | 56 | 88 | 94 | 80 |
| 20 minutes | 81 | 111 | 118 | 114 |
| 20 minutes | 80 | 106 | 113 | 111 |

In the above examples the high molecular aliphatic amines may be applied in conjunction with ozokerite, paraffin, paraffin oil or other similar agents.

We claim:—

1. The process which comprises incorporating with rubber sulfur, a vulcanization accelerator other than an aliphatic amine and a primary aliphatic amine possessing a straight or branched aliphatic chain of more than 9 carbon atoms.

2. The vulcanizates obtainable according to the process as claimed in claim 1.

WILHELM LOMMEL.
RUDOLF SCHRÖTER.